United States Patent
Pettersson et al.

(10) Patent No.: US 9,333,967 B2
(45) Date of Patent: May 10, 2016

(54) METHOD FOR CONTROLLING A DRIVE SYSTEM OF A VEHICLE, A DRIVE SYSTEM, A COMPUTER PROGRAM, A COMPUTER PROGRAM PRODUCT AND A VEHICLE

(71) Applicant: Scania CV AB, Södertälje (SE)

(72) Inventors: Niklas Pettersson, Stockholm (SE); Mikael Bergquist, Huddinge (SE); Johan Lindström, Nyköping (SE); Anders Kjell, Ekerö (SE); Mathias Björkman, Tullinge (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/411,131

(22) PCT Filed: Jun. 26, 2013

(86) PCT No.: PCT/SE2013/050793
§ 371 (c)(1),
(2) Date: Dec. 24, 2014

(87) PCT Pub. No.: WO2014/003673
PCT Pub. Date: Jan. 3, 2014

(65) Prior Publication Data
US 2015/0239459 A1   Aug. 27, 2015

(30) Foreign Application Priority Data

Jun. 27, 2012   (SE) ...................................... 1250708

(51) Int. Cl.
*B60W 10/115*   (2012.01)
*B60W 20/00*    (2006.01)
(Continued)

(52) U.S. Cl.
CPC .............. *B60W 20/102* (2013.01); *B60K 6/365* (2013.01); *B60K 6/48* (2013.01); *B60W 10/02* (2013.01);
(Continued)

(58) Field of Classification Search
USPC .......................................................... 701/22
See application file for complete search history.

(56) References Cited

U.S. PATENT DOCUMENTS

| 5,713,814 A | 2/1998 | Hara et al. ......................... 477/5 |
| 5,735,770 A | 4/1998 | Omote et al. ...................... 477/5 |

(Continued)

FOREIGN PATENT DOCUMENTS

| JP | 2003-319508 | 11/2003 | |
| JP | WO 2014087210 A1 * | 6/2014 | ............. B60K 6/445 |

OTHER PUBLICATIONS

International Search Report mailed Oct. 24, 2013 in corresponding PCT International Application No. PCT/SE2013/050793.

*Primary Examiner* — Shelley Chen
(74) *Attorney, Agent, or Firm* — Ostrolenk Faber LLP

(57) ABSTRACT

A method for controlling a drive system of a vehicle. The drive system includes a combustion engine (2) with an output shaft (2a), a gearbox (3) with an input shaft (3a), an electrical machine (9) that comprises a stator (9a) and a rotor (9b), and a planetary gear that comprises a sun gear (10), a ring gear (11) and a planet wheel carrier (12). If the torque from the combustion engine and the electrical machine is sufficient for the operation of the vehicle with the planetary gear in the released state, and if the fuel consumption of the vehicle with the planetary gear in the released state is lower than in the locked states, then control the electrical machine and the combustion engine so that the requested torque is provided while the planetary gear is in the released state. Otherwise the planetary gear is arranged in the locked state and the method is terminated.

17 Claims, 3 Drawing Sheets

(51) Int. Cl.
  *B60K 6/365* (2007.10)
  *B60K 6/48* (2007.10)
  *B60W 10/02* (2006.01)
  *B60W 10/06* (2006.01)
  *B60W 10/08* (2006.01)

(52) U.S. Cl.
  CPC .............. *B60W 10/06* (2013.01); *B60W 10/08* (2013.01); *B60W 10/115* (2013.01); *Y02T 10/6221* (2013.01); *Y10S 903/93* (2013.01); *Y10T 477/23* (2015.01)

(56) References Cited

U.S. PATENT DOCUMENTS

| | | | | |
|---|---|---|---|---|
| 5,895,333 A * | 4/1999 | Morisawa | ................ | B60K 6/24 475/5 |
| 6,336,889 B1 | 1/2002 | Oba et al. | ........................... | 477/5 |
| 6,354,974 B1 | 3/2002 | Kozarekar | ........................ | 475/5 |
| 8,292,770 B2 * | 10/2012 | Novikov | ................ | H02K 16/00 475/150 |
| 2004/0168841 A1 * | 9/2004 | Ohta | ...................... | B60K 6/365 180/65.25 |
| 2004/0255904 A1 * | 12/2004 | Izawa | .................... | B60K 6/445 123/352 |
| 2005/0209760 A1 * | 9/2005 | Tabata | ................... | B60K 6/445 701/53 |
| 2008/0076623 A1 * | 3/2008 | Tabata | ................... | B60K 6/445 477/5 |
| 2008/0188348 A1 | 8/2008 | Kumazaki et al. | ............... | 477/35 |
| 2009/0149290 A1 | 6/2009 | Wallner et al. | ................ | 475/149 |
| 2010/0044128 A1 * | 2/2010 | Oba | ...................... | B60K 6/387 180/65.25 |
| 2010/0048338 A1 * | 2/2010 | Si | ........................... | B60K 6/387 475/5 |
| 2010/0051360 A1 * | 3/2010 | Oba | ...................... | B60K 6/387 180/65.22 |
| 2010/0116615 A1 * | 5/2010 | Oba | ...................... | B60K 6/387 192/84.3 |
| 2010/0120579 A1 * | 5/2010 | Kawasaki | ............. | B60K 6/365 477/3 |
| 2010/0125020 A1 * | 5/2010 | Ikegami | ............. | B60K 6/365 477/3 |
| 2010/0173746 A1 * | 7/2010 | Ideshio | ............. | B60K 6/365 477/36 |
| 2011/0010063 A1 * | 1/2011 | Ota | ..................... | B60K 6/365 701/58 |
| 2012/0059542 A1 | 3/2012 | Kawai et al. | ..................... | 701/22 |
| 2012/0065017 A1 * | 3/2012 | Yamada | ................ | B60K 6/365 475/5 |

\* cited by examiner

METHOD FOR CONTROLLING A DRIVE SYSTEM OF A VEHICLE, A DRIVE SYSTEM, A COMPUTER PROGRAM, A COMPUTER PROGRAM PRODUCT AND A VEHICLE

CROSS-REFERENCE TO RELATED APPLICATIONS

The present application is a 35 U.S.C. §§371 National Phase conversion of PCT/SE2013/050793, filed Jun. 26, 2013, which claims priority of Swedish Patent Application No. 1250708-3, filed Jun. 27, 2012, the contents of which are incorporated by reference herein. The PCT International Application was published in the English language.

TECHNICAL FIELD

The present invention relates to a method for controlling a drive system of a vehicle, in particular a hybrid vehicle. The drive system comprises a combustion engine with an output shaft, a gearbox with an input shaft, an electrical machine that comprises a stator and a rotor, and a planetary gear that comprises three components in the form of a sun gear, a ring gear and a planet wheel carrier.

The output shaft of the combustion engine is connected to a first of said components of the planetary gear so that rotation of this shaft results in rotation of this component. The input shaft of the gearbox is connected with a second of said components of the planetary gear so that rotation of this shaft results in rotation of this component. The rotor of the electrical machine is connected with a third of said components of the planetary gearing so that a rotation of the rotor results in a rotation of this component.

The drive system furthermore comprises locking means transferable between a locked state, in which two of said components are locked together so that the three components rotate with the same speed of rotation, and a released state in which the components are allowed to rotate with different speeds of rotation.

The present invention also relates to a drive system for a vehicle according to above.

PRIOR ART

Hybrid vehicles can be operated by a primary motor that can be a combustion engine and a secondary motor that can be an electrical machine. The electrical machine is equipped with at least an energy storage for storing electrical energy and a control device for controlling the flow of electrical energy between the battery and the electrical machine. The electrical machine can thereby alternatingly work as a motor or as a generator dependent on the operation condition of the vehicle. When the vehicle is slowed down, the electrical machine generates electrical energy that is stored in the energy storage. The stored electrical energy is utilized later on for the operation of the vehicle. The electrical machine can be arranged in a position between a clutch mechanism and the gearbox in the vehicle.

Conventional drive systems are arranged so they only offer a few operational modes that are adapted for the main loads of the operation of the vehicle. A disadvantage with the conventional drive systems is that the operation modes at low load results in a relatively high fuel consumption for the operation of the vehicle and a limited range of torque.

U.S. Pat. No. 6,354,974 discloses a drive system for a hybrid vehicle. The hybrid vehicle comprises a combustion engine and an electrical machine that are arranged on the output shaft of the combustion engine. The purpose of this is to create a compact drive system that does not require a conventional clutch mechanism. The conventional clutch mechanism has been replaced by a planetary gear and three pieces of friction clutches. By means of the friction clutches different operation modes of the vehicle can be created. The use of friction clutches results in energy loss.

SUMMARY OF THE INVENTION

An objective of the present invention is to provide a method for controlling a drive system of a vehicle with the purpose of reducing the fuel consumption of the vehicle.

This objective is achieved by the previous mentioned method using the steps a)-d), a) receiving information on a requested torque for the operation of the vehicle, at least a first operation parameter of the combustion engine and at least a second operation parameter of the electrical machine, b) determining whether the available torque from the combustion engine and the electrical machine is sufficient for obtaining the requested torque with the planetary gear in the released state, c) determining the fuel consumption of the vehicle with planetary gear in the released state and also in the locked state on basis of the first and the second operation parameter, d) if the torque from the combustion engine and the electrical machine is sufficient for obtaining the requested torque with the planetary gear in the released state, and if the fuel consumption of the vehicle with the planetary gear in the released state is lower than in the locked state, the planetary gear is arranged or maintained in the released state and the electrical machine and the combustion engine are controlled so that the requested torque is provided while the planetary gear is in the released state. Otherwise, the planetary gear is arranged or maintained in the locked state and the method is terminated.

At low load of operation of the vehicle, it is preferable from a fuel economy point of view to operate the drive system according to the method. The method comprises the steps of determining if the torque from the combustion engine and the electrical machine is sufficient for the operation of the vehicle with the planetary gear in the released state, that is, if it is possible to drive the vehicle with the planetary gear in the released state with the requested torque. The method comprises further the steps of determining if the fuel consumption of the vehicle with the planetary gear in the released state is lower than the fuel consumption in the locked state, that is, if it is preferable to drive the vehicle with the planetary gear in the released state with regards to the fuel consumption of the vehicle. This determination is possible independently of the planetary gear being in the released state or in the locked state. If a lower fuel consumption is achieved with the planetary gear in the released state than in the locked state, the planetary gear is arranged or maintained in the released state. In other case the planetary gear is arranged or maintained in the locked state. The determination thus takes place independently of the state of the planetary gear, and the vehicle is thereafter driven with the planetary gear in the most favorable state by changing or maintaining the state of the planetary gear.

If both conditions are fulfilled, the method comprises in a subsequent step to control the electrical machine and the combustion engine at the same time so that the requested torque is provided. The control of the electrical machine and the combustion engine is performed while the planetary gear is in the released state and while the rotational speed of the combustion engine is maintained constant. If on the other hand any of the conditions is not fulfilled, the planetary gear is arranged in the locked state and the method is terminated.

By means of the operation of the vehicle according to the method with maintained speed of rotation of the combustion engine, it is possible to reduce the fuel consumption because a low speed of rotation results in less friction loss in the combustion engine compared to a high speed of rotation. The method accordingly enables a reduced fuel consumption compared with prior art drive systems.

The combustion engine according to the method contributes to propelling the vehicle and not only to drive possible auxiliary equipment in the vehicle as in prior art. The method is suitable at low operation load/requested torque compared with the main operation load/requested torque of the vehicle.

The method enables controlling the speed of rotation of the combustion engine with the purpose of obtaining optimal operational condition. The low speed of rotation enables for example a temperature increase of the exhaust gas temperature from the combustion engine, which is an advantage for purification of exhaust gases in an exhaust gas treatment system.

According to an embodiment of invention, the method is initiated with the steps:
  receiving information on a first operation parameter of the combustion engine and a second operation parameter of the electrical machine,
  determining the fuel consumption of the vehicle with the planetary gear in the released state and in the locked state on basis of the first and the second operation parameter,
  if the fuel consumption of the vehicle with the planetary gear in the released state is lower than in the locked state, the planetary gear is arranged in the released state and the steps a)-d) are iterated. The iteration according to step a)-d) is accordingly initiated only if the released state results in lower fuel consumption than in the locked state.

According to an embodiment of the invention, the drive system at said initiation of the method is in a state where the planetary gear is in the locked state, the vehicle is in operation and the gearbox is arranged with a gear. The state where the planetary gear is in the locked state, the vehicle is in operation and the gearbox is arranged with a gear relates to the main operational condition of the vehicle at high load.

According to an embodiment of the invention, the electrical machine is controlled with regards to one of a torque and a speed of rotation, and the combustion engine is controlled with regards the other of the torque and the speed of rotation.

Preferably the electrical machine is controlled with regards to the torque while the combustion engine is controlled with regards to the speed of rotation. Thereby, the method enables operation of the vehicle at low speed of rotation of the combustion engine, which is an advantage for reducing the fuel consumption. Alternatively, the electrical machine is controlled with regards to a speed of rotation while the combustion engine is controlled with regards to a torque.

According to an embodiment of the invention, the combustion engine is controlled so that the speed of rotation of the combustion engine is minimized with regards to a requested torque of the combustion engine. By mean of minimizing the speed of rotation of the combustion engine, the fuel consumption of the vehicle is reduced. The combustion engine is rotationally speed controlled to the lowest speed of rotation where the requested torque can be provided. Normally this speed of rotation is the same as the speed of rotation at an idle state of the combustion engine that is the lowest possible from comfort point of view.

According to an embodiment of the invention, the combustion engine is controlled so that the combustion engine receives a speed of rotation relating to an idle state. The term "rotational speed at idle state" relates to a state in which the combustion engine has a speed of rotation at the idle operation mode, where the combustion engine does not contribute with torque.

According to an embodiment of the invention, the first operation parameter is the speed of rotation of the combustion engine. The fuel consumption of the vehicle is dependent on the speed of rotation of the combustion engine because friction loss increases with increasing speed of rotation. Accordingly, it is preferable to have as low speed of rotation of the combustion engine as possible for reducing the fuel consumption during iteration of the steps a)-d).

According to an embodiment of the invention, the second operation parameter is the generated torque of the electrical machine. The fuel consumption of the vehicle is dependent on the generated torque of the electrical machine because the amount of energy in the energy storage decreases in dependence of the generated torque and thereafter is refilled by mean of energy from the combustion engine.

According to an embodiment of the invention, the planet wheel carrier and the sun gear are locked to each other when the planetary gear is arranged in the locked state and the planet wheel carrier and the sun gear are released from each other when the planetary gear is arranged in the released state.

According to an embodiment of the invention, whether the torque from the combustion engine is sufficient for the operation of the vehicle with the planetary gear in the released state is determined based on [generated torque from the combustion engine×transmission ratio] and whether the torque from the electrical machine is sufficient for operating the vehicle with the planetary gear in the released state is determined based on [generated torque from the electrical machine×[1−transmission ratio]], where the transmission ratio is given by the ratio between the number of teeth of the sun gear and [number of teeth of the ring gear+the number of teeth of the sun gear]. Preferably the planetary gear is arranged with a planetary gear equation according to the following transmission ratio: $-z_r/z_s=\omega_s-\omega_c/(\omega_r-\omega_s)=102/66$, where z relates to the number of teeth, w rotational speed, index s sun gear and index r ring gear.

Another objective of the present invention is to provide a method for controlling a drive system with the purpose of reducing the wear of the gearbox at acceleration of the vehicle.

The invention achieves this objective by means an embodiment of the invention, where the gearbox comprises at least a first gear with a first lowest torque, and a second gear with a second lowest torque, and a third gear with a third lowest torque, wherein the first lowest torque is lower than the second lowest torque and the second lowest torque is lower than the third lowest torque, wherein the method comprises:
  arranging or maintaining the planetary gear in the released state while the gearbox is arranged in the first gear,
  increasing the torque of the drive system from at least the second lowest torque to at least the third lowest torque by means of increasing the torque of the combustion engine and the electrical machine while maintaining the speed of rotation of the combustion engine,
  changing gear of the gearbox from the first gear to the third gear, and
  arranging the planetary gear in the locked state and terminating the method.

The method enables to skip gears during acceleration of the vehicle by means of that the electrical machine contributes with torque comprising at least the second lowest torque to at least the third lowest torque when the gearbox is arranged in the first gear, and at least the third lowest torque when the gearbox is arranged in the third gear. The method makes it possible to accelerate the vehicle without change from the first gear to the third gear in subsequent in order, which provides reduced wear on the gearbox. Furthermore an improved comfort is obtained at acceleration of the vehicle in that for example possible jerks when changing gears are avoided.

According to an embodiment of the invention, the locking means are adapted to in the locked state connect the ring gear and the planet wheel carrier so that they rotate together. The change from the locked state to the released state comprises:
controlling the electrical machine and the combustion engine to a condition mutual free of torque, and
releasing the locking means from engagement with the ring gear and the planet wheel carrier so that the ring gear and the planet wheel carrier are freely rotatable in relation to each other.

According to an embodiment of the invention, the locking means are adapted to in the locked state connect the ring gear and the planet wheel carrier so that they rotate together, the change from the released state to the lock state comprises:
controlling the electrical machine and the combustion engine to a condition mutual free of torque, and
displacing the locking means to engagement with the ring gear and the planet wheel carrier.

According to an embodiment of the invention, the output shaft of the combustion engine is connected with the sun gear so that they rotate as a unit with a first speed of rotation, that the input shaft of the gearbox is connected with the planet wheel carrier so that they rotate as a unit with a second speed of rotation, and that the rotor of the electrical machine is connected with the ring gear so that the ring gear rotates with a third speed of rotation.

The present invention also relates to the previously mentioned drive system. The drive system is characterised in that it comprises a control unit adapted to receive information about a torque demanded to drive the vehicle, at least a first operation parameter of the combustion engine and at least a second operation parameter of the electric machine, to determine whether the available torque from the combustion engine and the electric machine is sufficient to reach the demanded torque with the planetary gear in the released state, and to determine the fuel consumption of the vehicle with the planetary gear in the released state and in the locked state on the basis of the first and the second operation parameter, the control unit further being adjusted to, if the torque from the combustion engine and the electrical machine is sufficient for the operation of the vehicle with the planetary gear in the released state, and if the fuel consumption of the vehicle with the planetary gear in the released state is lower than in the locked state, arrange or maintain the planetary gear in the released state and control the electrical machine and the combustion engine so that the requested torque is provided while the planetary gear is in the released state and while maintaining speed of rotation of the combustion engine.

According to an embodiment of the invention, the drive system comprises means for controlling the speed of rotation of the combustion engine. For example, the means for controlling the speed of rotation is a rotational speed regulator.

According to an embodiment of the invention, the drive system comprises means for controlling the torque of the electrical machine. Preferably, the generated torque from the electrical machine is controlled by the control unit that controls the feeding of electrical power.

BRIEF DESCRIPTION OF THE DRAWINGS

In the following, preferable embodiments of the invention, such as an example, will be described with reference to the annexed figures.

DETAILED DESCRIPTION OF EMBODIMENTS OF THE INVENTION

Figure 1A:
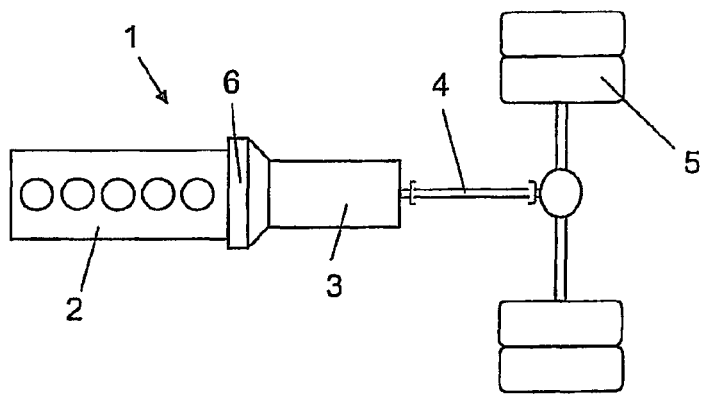
FIG. 1a discloses a drive system for operating a vehicle according to the present invention.

FIG. 1a discloses a driveline for a heavy vehicle 1. The driveline comprises a combustion engine 2, a gearbox 3, a plurality of drive shafts 4 and drive wheels 5. The drive line comprises an intermediate part 6 between the combustion engine 2 and the gearbox 3.

Figure 1B:
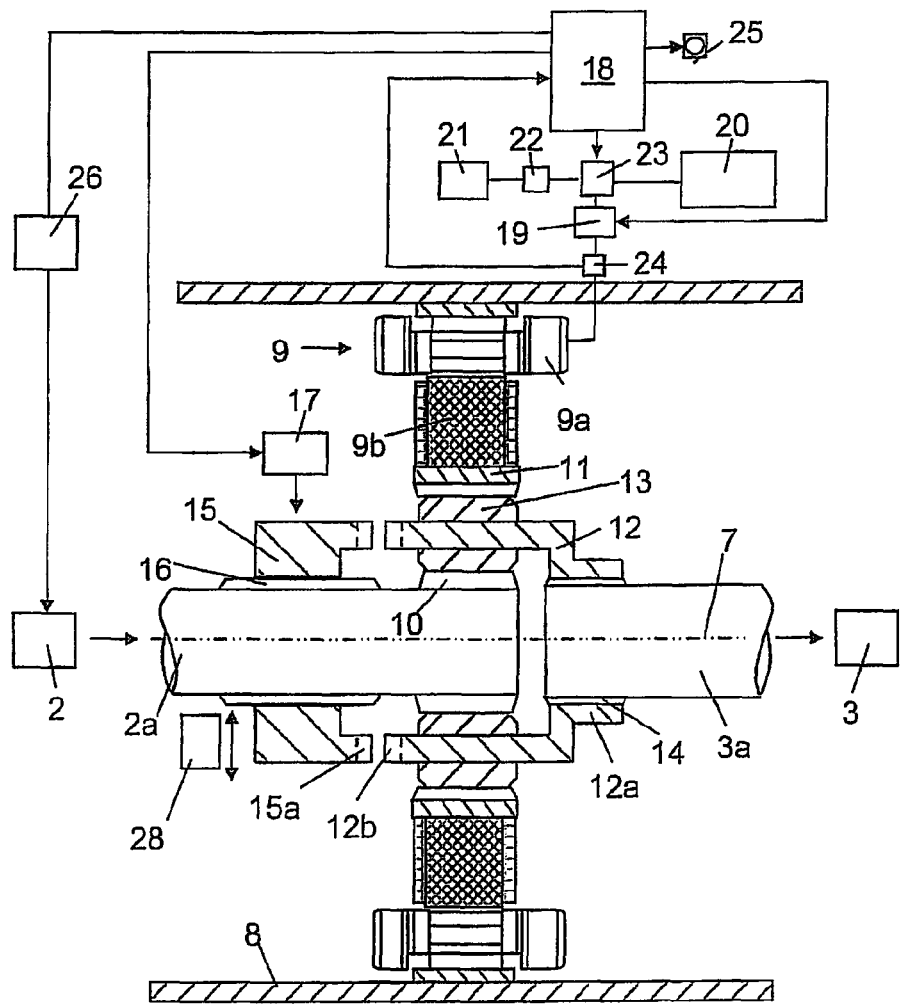
FIG. 1b discloses the drive system of FIG. 1a in detail.

FIG. 1b discloses the components in the intermediate part 6 in detail. The combustion engine 2 is provided with an output shaft 2a and the gearbox 3 with an input shaft 3a in the intermediate part 6. The output shaft 2a of the combustion engine is coaxially arranged in relation to the input shaft 3a of the gearbox. The output shaft 2a of the combustion engine and the input shaft 3a of the gearbox are rotatably arranged around the axis 7. The intermediate part 6 comprises a housing 8 that encloses an electrical machine 9 and a planetary gear. The electrical machine 9 comprises in usual way a stator 9a and a rotor 9b. The stator 9a comprises a stator core that is attached in suitable way on the inside of the housing 8. The stator core comprises windings of the stator. The electrical machine 9 is adapted to, during certain operational modes, utilize stored electrical energy for providing power to the input shaft 3a of the gearbox and during other operational modes utilize kinetic energy of the input shaft 3 of the gearbox for generating and storing electrical energy.

The planetary gear is arranged essentially radial inside of the stator 9a and the rotor 9b of the electrical machine. The planetary gear comprises in usual way a sun gear 10, a ring gear 11 and a planet wheel carrier 12. The planet wheel carrier 12 carries a number of cog wheels 13 that are rotatable arranged in a radial space between the cogs of the sun gear 10 and the ring gear 11. The sun gear 10 is attached on a peripheral surface of the output shaft 2a of the combustion engine. The sun gear 10 and the output shaft 2a of the combustion engine rotate as a unit with a first speed of rotation $n_1$. The planet wheel carrier 12 comprises an attachment part 12a that is attached on a peripheral surface of the input shaft 3a of the gearbox by means of a spline attachment 14. By means of this attachment, the planet wheel carrier 12 and the input shaft 3a of the gearbox can rotate as a unit with a second speed of rotation $n_2$. The ring gear 11 comprises an external peripheral surface on which the rotor 9b is attached. The rotor 9b and the ring gear 11 comprise a rotatable unit that rotates with a third speed of rotation $n_3$.

The drive system comprises also locking means adapted to switch the planetary gear between a released state in which the sun gear 10, the ring gear 11 and the planet wheel carrier 12 are freely rotatable in relation to each other, and a locked state in which the planet wheel carrier 12 and the sun gear 10 are locked to each other. The locking means are adapted in the locked state to connect the ring gear 11 and the planet wheel carrier 12 so that they rotate together.

The change between the locked state and the released state comprises controlling the electrical machine 9 and the combustion engine 2 to a condition mutually free of torque and thereafter displace the locking means from/to engagement with the ring gear 11 and the planet wheel carrier 12.

The locking means comprises a displaceable connection member 15 on the output shaft 2a of the combustion engine. The connection member 15 is attached on the output shaft 2a of the combustion engine by means of a spline attachment 16. The connection member 15 is in this case rigidly attached with regards to torsion on the output shaft 2a of the combustion engine and displaceable arranged in an axial direction on the output shaft 2a of the combustion engine. The connection member 15 comprises a connection part 15a that is connectable with a connecting part 12b of the planet wheel carrier 12. The locking means further comprises a displacement member 17 adapted to displace the connection member 15 between the released state when the connection parts 15a, 12b are not in engagement with each other and the locked state when the connection part 15a, 12b are in engagement with each other. When the connection parts 15a, 12b are in engagement with each other, the output shaft 2 of the combustion engine and the input shaft 3 of the gearbox will rotate with the same speed of rotation.

An electrical control unit 18 or a plurality of electrical control units 18 in combination are adapted to control the displacement member 17. The control unit 18 is also adapted to determine at which occasion that the electrical machine 9 will work as a motor and at which occasion it will work as a generator. To determine this, the control unit 18 can receive immediate information from suitable operation parameters. The control unit 18 can be a computer with suitable software for this purpose. The control unit 18 controls also a schematically disclosed control equipment 19 that controls the flow of electrical energy between an energy storage 20 and the stator 9a of the electrical machine. When the electrical machine works as a generator, electrical energy is provided to the energy storage 20 from the stator 9a. The energy storage 20 delivers and stores electrical energy with a voltage in the range of 300-700 volt. It is necessary that the electrical machine 9 and the planetary gear composes a compact unit because the intermediate part 6 between the combustion engine 2 and the gearbox 3 in a vehicle is limited in size. The components of the planetary gear 10-12 are here arranged essentially radially on the inside of the stator 9a of the electrical machine. The rotor 9b of the electrical machine, the ring gear 11 of the planetary gear, the output shaft 2a of a combustion engine and the input shaft 3a of the gearbox are here rotatably arranged around a common rotation axis 7. With such arrangement, the electrical machine 9 and the planetary gear requires a relatively small space.

The vehicle comprises a 24 volt battery 21 for starting the combustion engine 2 and operation of auxiliary equipment in the vehicle 1. In heavy vehicles 1, a 24 volt battery 21 with relatively high capacity is used. The 24 volt battery 21 is connected by means of an electrical conductor and a switch mechanism 23 with the stator 9a of the electrical machine. The electrical connection comprises a DC-DC transformer 22 between the 24 volt battery 21 and the switch mechanism 23. The DC-DC transformer 22 has the capacity to transform electrical energy that is conducted from the stator 9a of the electrical machine, which delivers electrical energy with the same voltage as that of the energy storage 20, to the voltage level that is present in the 24 volt battery 21. The DC-DC transformer 22 can preferably be of two-way type. It can thereby also when required conduct electrical energy from the 24 volt energy storage 20 to the stator 9a of the electrical machine. When electrical energy is conducted in this direction, the DC-DC transformer transforms electrical energy with voltage 24 volt to the higher voltage of the hybrid battery.

The drive system comprises means for detecting a first operation parameter of the combustion engine 2 and a second operation parameter of the electrical machine 9. Preferably, the first operation parameter is the speed of rotation of the combustion engine and the second operation parameter is the generated torque of the electrical machine 9 that for example is dependent on magnitude and phase of the current to the electrical machine. The means for detecting the first operation parameter is for example a speed regulator connected to the combustion engine 2. The means for detecting the second operation parameter is for example a control system of the electrical machine 9 that provides information on the magnitude and phase of the current.

The method of the invention will be explained in detail with reference to FIGS. 2 and 3. The steps in the method are controlled by means of the control unit 18.

Figure 2:
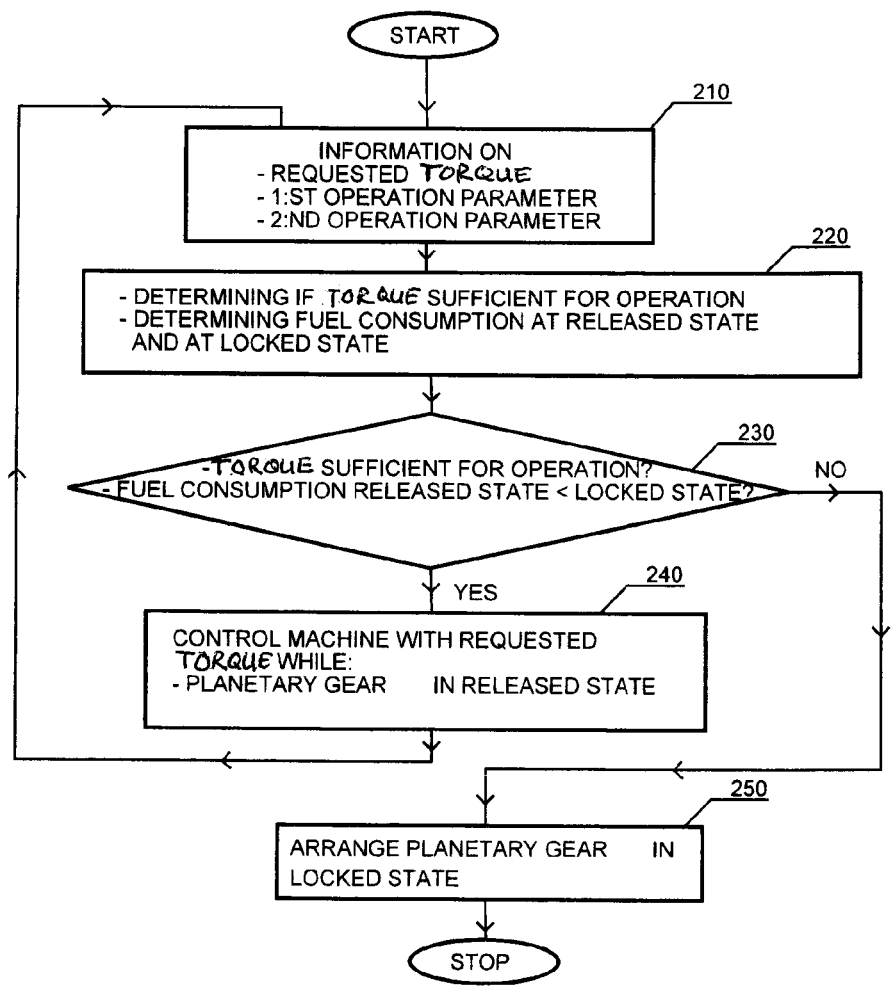
FIG. 2 discloses a flow chart of a method for controlling the drive system according to a first embodiment of the invention.

FIG. 2 discloses a method according to a first embodiment of the invention.

The method is initiated in a step 210 by receiving information on a requested torque for the operation of the vehicle, a first operation parameter of the combustion engine 2 and a second operation parameter of the electrical machine 9.

The requested torque is determined by the user of the vehicle. The first operation parameter of the combustion engine 2 and the second operation parameter of the electrical machine 9 are parameters that affects the fuel consumption of the vehicle in both the released state and the locked state of the planetary gear. Preferably, the first operation parameter is the speed of rotation of the combustion engine and the second operation parameter is the generated torque from the electrical machine 9.

In a step 220 is determined:
  if the torque from the combustion engine 2 and the electrical machine 9 is sufficient for the operation of the vehicle with the planetary gear in the released state, and
  the fuel consumption with the planetary gear in the released state and the locked state.

In a step 230, it is determined whether the following two conditions are fulfilled:
  i) if the torque from the combustion engine 2 and the electrical machine 9 are sufficient for the operation of the vehicle with the planetary gear in the released state, and
  ii) if the fuel consumption with the planetary gear in the released state is less than the fuel consumption in the locked state.

If the two conditions are affirmative, the method continues to a step 240, where the electrical machine 9 and the combustion engine 2 are controlled so that the requested torque is provided while the planetary gear is in the released state and while maintaining the rotational speed of the combustion engine unchanged. If on the other hand at least one of the conditions are negative, the planetary gear is in a step 250 arranged in the locked state and the method is terminated.

The steps 210-240 of the method are iterated until any of the conditions in step 230 are negative. The method can also be terminated in other manners, such as on the order of the user. The iteration of the method according to steps 210-240 results in a reduced fuel consumption when driving the vehicle.

Figure 3:
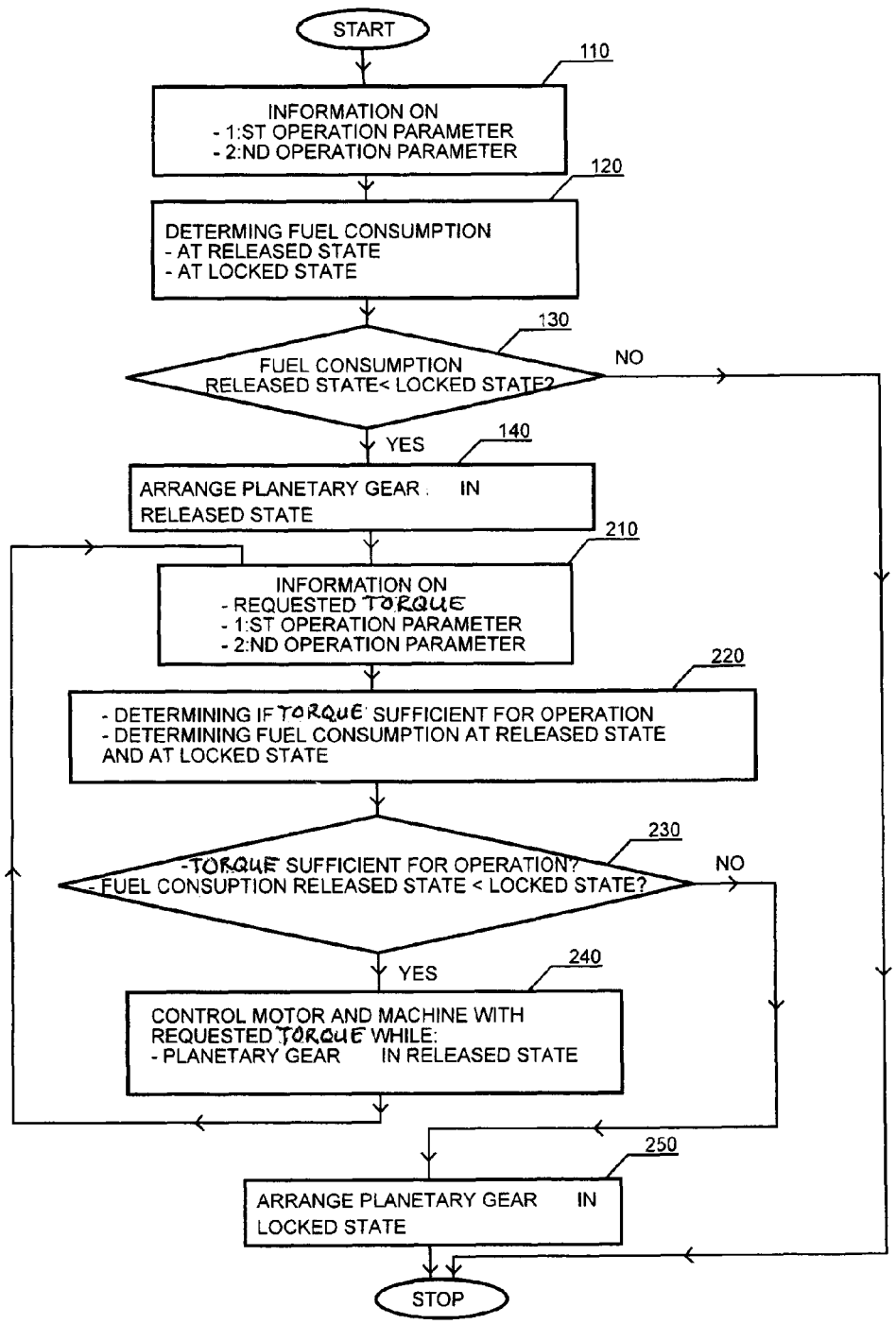
FIG. 3 discloses a flow chart of a method for controlling the drive system according to a second embodiment of the invention.

FIG. 3 discloses a method according to a second embodiment of the invention. The second embodiment differs from the first embodiment by the initial steps of the method.

The method is initiated in a step 110 with the receipt of information on a requested torque for the operation of the vehicle, a first operation parameter of the combustion engine 2 and a second operation parameter of electrical machine 9.

In a step 220, the fuel consumption is determined for the planetary gear in the released state respectively in the locked state. In a step 230, it is determined if the fuel consumption with the planetary gear in the released state is lower than in the locked state.

If the fuel consumption with the planetary gear in the released state is lower than in the locked state, the planetary gear is arranged in the released state in a step 130 and the method is iterated according to the step 210-240 in the same manner as in FIG. 2. Otherwise the method is terminated.

In certain driving modes, it is better from fuel economic point of view to drive the vehicle with the planetary gear in the released state. These drive modes are typical when a low positive or negative torque from the driveline is necessary. Energy is saved by means of that the combustion engine can be operated at a lower rotational speed where the friction loss is considerably lower.

Driving with the combustion engine 2 in the idle state and the vehicle powered by the electrical machine 9 can also be realized in a parallel hybrid. Compared with the parallel hybrid, the compact hybrid provides larger available positive torque in the released state. Therefore, driving with low combustion torque can be utilized for many drive modes.

The released state can also be utilized for skipping gears during acceleration. When it is time to gear up, the planetary gear is switched to the released state and accelerated a bit further by means of the higher speed of rotation of the electrical machine, and thereafter synchronizing to a higher gear.

When driving in the released state, the electrical machine 9 and the combustion engine 2 are torque controlled to the lowest speed of rotation at which the requested torque can be obtained. Normally, this is the same speed of rotation as the idle speed of rotation of the motor 2, that is, the lowest possible speed of rotation in view of comfort, such as vibration, etcetera.

Control of speed of rotation is realized with a speed regulator that regulates the combustion engine 2 to the desired rotational speed of rotation by means of torque control. In the control system, this speed regulator is positioned close to the actuator.

When the planetary gear is arranged in the released state and the combustion engine 2 is operated at its idle speed of rotation, two effects are obtained:
i) the friction loss in the combustion engine 2 decreases due to the decreased speed of rotation,
ii) the losses in the electrical machine 9 and the energy storage 20 increases because a larger amount of the torque of the driveline is created by the electrical machine 9.

Furthermore the charge balance in the energy storage 20 is changed so that this thereafter must either be recharged or drained in such a way that possibly creates more loss than would have been the case if the planetary gear was not in the released state. Also this future loss must be taken into account in the increasing electrical loss that is the result of driving with the planetary gear in the released state. It is fuel economically desirable to drive with the planetary gear in the released state if the decreasing loss according to item i) exceeds the increasing loss according to item ii).

The advantage of driving electrically with the parallel hybrid and the planetary gear in the released state are the following:

- at positive torque from the driveline, the combustion engine helps with 40% (transmission dependent) of the torque in spite of that it is in idle speed of rotation,
- the combustion engine 2 provides useful work in the drive system in addition to driving possible auxiliary units (such as steering servo unit),
- larger available torque range at positive torque from the driveline than with only the electrical machine 9,
- exhaust gas temperature can be raised by means that a larger torque from the combustion engine can be used at a low speed of rotation, which is an advantage for the exhaust gas treatment system,
- when braking/brake recovery, the fuel necessary for the combustion engine 2 is reduced because it will be released during braking.

A disadvantage compared with driving electrical mode with the parallel hybrid and the planetary gear in the released state is that it is only possible to slow down with limited torque in this mode in order so that the combustion engine 2 does not increase in speed of rotation.

The combustion engine 2 can also be turned off during this drive mode. It is then reduced to zero speed of rotation with a fly wheel brake, alternatively controlled down to zero by means of the electric machine torque being temporarily adjusted with suitable positive torque. The acceleration of the vehicle can at the same time be controlled by the control unit 18 by means of the vehicle brake.

The invention is not limited to the disclosed embodiments but can be modified and varied within the frame work of the following patent claims.

The invention claimed is:

1. A method for controlling a drive system of a vehicle, wherein the drive system comprises a combustion engine having an output shaft, a gearbox having an input shaft, an electrical machine comprising a stator and a rotor, and a planetary gear comprising three components comprising a sun gear, a ring gear and a planet wheel carrier;
   connecting the output shaft of the combustion engine with a first one of the components of the planetary gear such that rotation of the output shaft causes rotation of the first component;
   connecting the input shaft of the gearbox with a second one of the components of the planetary gear such that rotation of the input shaft causes rotation of the second component;
   connecting the rotor of the electrical machine with a third one of the components of the planetary gear such that rotation of the rotor causes a rotation of the third component;
   wherein the drive system further comprises locking means transferable between a locked state in which two of the components of the planetary gear are locked together for causing the three components to rotate with a same speed of rotation and a released state in which the three components are allowed to rotate with different respective speeds of rotation; and
   the method comprising steps a)-d) of:
   a) receiving information for a requested torque for operation of the vehicle, wherein the information comprises at least a first operation parameter of the combustion engine and at least a second operation parameter of the electrical machine,
   b) determining whether an available torque from the combustion engine and from the electrical machine are sufficient for obtaining the requested torque with the planetary gear in the released state, c) determining a fuel consumption of the vehicle with the planetary gear in the released state and in the locked state thereof based on the first and the second operation parameters, d) if the torque from the combustion engine and the electrical machine is sufficient for obtaining the requested torque with the planetary gear in the released state, and if the fuel consumption of the vehicle with the planetary gear in the released state is lower than in the locked state, arranging or maintaining the planetary gear in the released state and controlling the electrical machine and the combustion engine so that the requested torque is provided while the planetary gear is in the released state, and otherwise arranging or maintaining the planetary gear in the locked state and terminating the method.

2. A method for controlling a drive system according to claim 1, further comprising:
   initiating the method with the steps:
   receiving information on a first operation parameter of the combustion engine and a second operation parameter of the electrical machine;
   the step of determining the fuel consumption of the vehicle with the planetary gear in the released state and in the locked state thereof, based on the first and the second operation parameter; and
   if the fuel consumption of the vehicle with the planetary gear in the released state is lower than in the locked state, arranging the planetary gear in the released state and performing the steps a)-d).

3. A method for controlling a drive system according to claim 1, further comprising controlling the electrical machine with regards to one of a torque and a speed of rotation thereof, and controlling the combustion engine with regards to the other of the torque and the speed of rotation.

4. A method for controlling a drive system according to claim 3, further comprising controlling the combustion engine such that the speed of rotation of the combustion engine is minimized with regards to a requested torque of the combustion engine.

5. A method for controlling a drive system according to claim 4, further comprising controlling the combustion engine to an idle speed of rotation.

6. A method for controlling a drive system according to claim 2, wherein the first operation parameter is a speed of rotation of the combustion engine.

7. A method for controlling a drive system according to claim 6, wherein the second operation parameter is a generated torque of the electrical machine.

8. A method for controlling a drive system according to claim 1, further comprising:
   determining whether the torque from the combustion engine is sufficient for operation of the vehicle with the planetary gear in the released state based on generated torque from the combustion engine×transmission ratio; and
   determining whether the torque from the electrical machine is sufficient for operation of the vehicle with the planetary gear in the released state based on generated torque from the electrical machine×1−transmission ratio, where the transmission ratio is a ratio between a number of teeth of the sun gear and a number of teeth of the ring gear+a number of teeth of the sun gear.

9. A method for controlling a drive system according to claim 1, wherein the gearbox comprises at least a first gear with a first lowest torque, and a second gear with a second lowest torque, and a third gear with a third lowest torque, wherein the first lowest torque is lower than the second lowest torque and the second lowest torque is lower than the third lowest torque,
   the method further comprising:
   arranging or maintaining the planetary gear in the released state while the gearbox is arranged in the first gear;
   increasing the torque of the drive system from at least the second lowest torque to at least the third lowest torque by controlling the combustion engine and the electrical machine while maintaining a speed of rotation of the combustion engine;
   changing gear of the gearbox from the first gear to the third gear; and
   arranging the planetary gear in the locked state and then terminating the method.

10. A method for controlling a drive system according to claim 1, wherein in the locked state, the locking means is configured to connect the ring gear and the planet wheel carrier to rotate together; and
    a change from the locked state to the released state comprises:
    controlling the electrical machine and the combustion engine to a condition mutually free of torque, and
    releasing the locking means from engagement with the ring gear and the planet wheel carrier so that the ring gear and the planet wheel carrier are freely rotatable in relation to each other.

11. A method for controlling a drive system according to claim 10, wherein the locking means in the locked state is configured to connect the ring gear and the planet wheel carrier so that they rotate together; and
    a change from the released state to the locked state comprises:
    controlling the electrical machine and the combustion engine to a condition mutually free of torque, and
    displacing the locking means from engagement with the ring gear and the planet wheel carrier.

12. A method for controlling a drive system according to claim 1, wherein
    the output shaft of the combustion engine is connected with the sun gear so that they rotate as a unit with a first speed of rotation ($n_1$);
    the input shaft of the gearbox is connected with the planet wheel carrier so that they rotate as a unit with a second speed of rotation ($n_2$); and
    the rotor of the electrical machine is connected with the ring gear so that the ring gear rotates with a third speed of rotation ($n_3$).

13. A drive system for a vehicle, the drive system comprising:
    a combustion engine with an output shaft;
    a gearbox with an input shaft;
    an electrical machine comprising a stator and a rotor;
    a planetary gear comprising three components in the form of a sun gear, a ring gear and a planet wheel carrier;
    the output shaft of the combustion engine is connected with a first one of the components of the planetary gear so that a rotation of the output shaft causes a rotation of the first component,
    the input shaft of the gearbox is connected with a second one of the components of the planetary gear so that a rotation of the input shaft causes a rotation of the second component;
    the rotor of the electrical machine is connected with a third one of the components of the planetary gear so that rotation of the rotor causes a rotation of the component, the drive system further comprises locking means transferable between a locked state in which two of the components are locked together so that the three components rotate with the same speed of rotation and a released state in which the components are allowed to rotate with different respective speeds of rotation;

the drive system comprises a control unit configured to receive information about a torque demanded to drive the vehicle;

at least a first operation parameter of the combustion engine and at least a second operation parameter of the electric machine, configured for determining whether the available torque from the combustion engine and the electric machine is sufficient to reach the demanded torque with the planetary gear in the released state, and to determine the fuel consumption of the vehicle with the planetary gear in the released state and in the locked state based on the first and the second operation parameter;

if the torque from the combustion engine and the electrical machine is sufficient for the operation of the vehicle with the planetary gear in the released state, and if the fuel consumption of the vehicle with the planetary gear in the released state is lower than in the locked state, adjusting the control unit further to arrange or maintain the planetary gear in the released state and to control the electrical machine and the combustion engine so that the requested torque is provided while the planetary gear is in the released state and while maintaining the speed of rotation of the combustion engine.

14. A drive system for a vehicle according to claim 13, further comprising means for controlling the speed of rotation of the combustion engine.

15. A drive system for a vehicle according to claim 13, wherein the drive system comprises means for controlling the torque of the electrical machine.

16. A computer program product comprising a non-volatile data storage medium that is readable by a computer, and a computer program stored therein, wherein the program comprises computer program code operable to implement a method according to claim 1 when the program code is executed in the computer.

17. A vehicle comprising a drive system according to claim 13.

\* \* \* \* \*